United States Patent

[11] 3,582,839

[72] Inventors Kendall A. Pim
Cleveland Heights;
Don A. Berlincourt, Chagrin Falls, both of, Ohio
[21] Appl. No. 734,911
[22] Filed June 6, 1968
[45] Patented June 1, 1971
[73] Assignee Clevite Corporation

[54] COMPOSITE COUPLED-MODE FILTER
8 Claims, 3 Drawing Figs.

[52] U.S. Cl. .......... 333/72, 310/8.3, 310/8.5, 310/9.8
[51] Int. Cl. .......... H03h 9/32
[50] Field of Search .......... 333/71, 72; 310/8.1—9.7, 9.8

[56] References Cited
UNITED STATES PATENTS

| | | | |
|---|---|---|---|
| 2,886,787 | 5/1959 | Broadhead, Jr. et al. | 333/72 |
| 3,185,943 | 5/1965 | Honda et al. | 333/72 |
| 3,422,371 | 1/1969 | Poirier et al. | 310/8.2X |

OTHER REFERENCES
" Vapor-Deposited Thin-Film Piezoelectric Transducers" De Klerk and Kelly in The Review of Scientific Instruments - Vol. 36 No. 4 April 1965, Published by the American Institute of Physics Q 184 R5; Pages 506—508

*Primary Examiner*—Herman Karl Saalbach
*Assistant Examiner*—Marvin Nussbaum
*Attorney*—Frederic B. Schramm

ABSTRACT: An essentially two-dimensional electric-wave filter is formed by depositing a film of piezoelectric material upon a substrate and by applying input and output electrode pairs to different portions of the film. Each electrode pair together with the film and substrate form a composite resonator. The two composite resonators are located for a desired mechanical coupling between the two composite resonators. The filter may also consist of an array of *n* coupled composite-resonators having a common film and a common substrate and having the electrode pairs of two resonators of the array serving as input and output electrodes.

INVENTORS.
DON A. BERLINCOURT
KENDALL A. PIM
BY Frederic B. Schramm
ATTORNEY

COMPOSITE COUPLED-MODE FILTER

DESCRIPTION

In carrying out the invention in accordance with a preferred form thereof, a common substrate is provided for a plurality of resonators consisting of portions of thin film of piezoelectric material deposited upon the substrate and corresponding portions of the substrate. The portions of the film forming the resonators have electrodes upon the upper and lower surfaces and mechanical coupling from one resonator to the next. The film may be formed by evaporation technique and is considerably thinner than the substrate, for example, of the order of one tenth as thick. The electrodes, in turn, are considerably thinner than the film, for example, of the order of one-tenth the film thickness. They may be formed by evaporation of metal on the selected portions of the surface.

Figure 1:
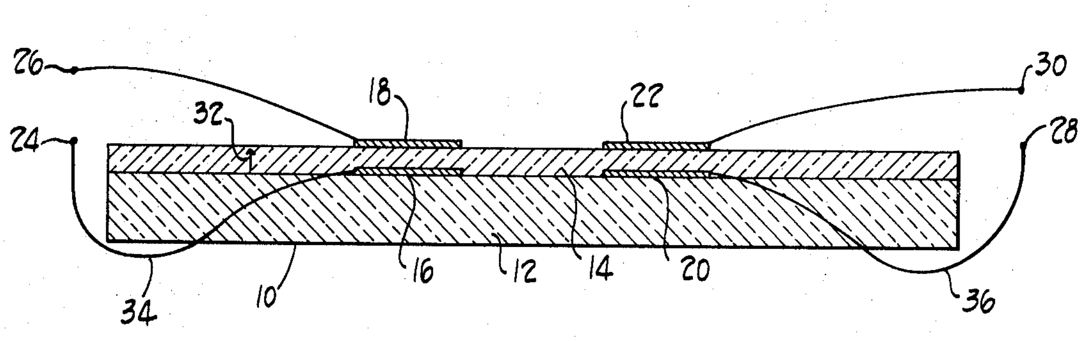
Figure 2:
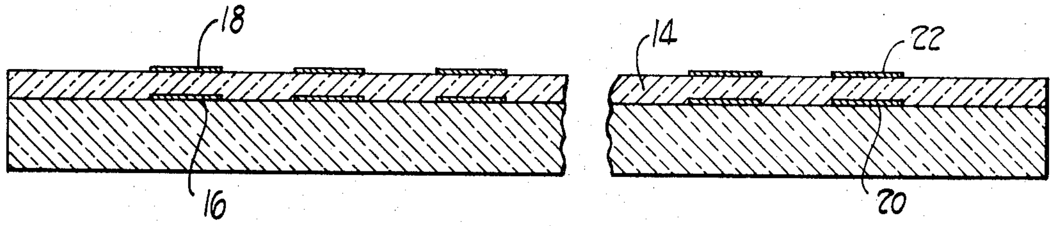
Figure 3:
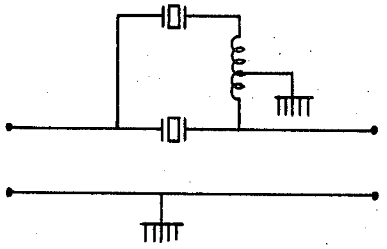

A better understanding of the invention will be afforded by the following detailed description considered in conjunction with the accompanying drawing in which FIG. 1 is a view of a cross section of a composite coupled-mode filter forming an embodiment of the invention, FIG. 2 is a view of a cross section of a composite coupled-mode filter in accordance with the invention having a plurality of resonators with two of the resonators serving as an input transducer and an output transducer, respectively, and FIG. 3 is a circuit diagram of a hybrid-lattice filter representing in certain respects electric circuit equivalent of the composite coupled-mode filter of FIG. 1.

Like reference characters are utilized throughout the drawing to designate like parts.

FIG. 1 of the drawing shows a composite coupled-mode filter with only input and output electrodes in accordance with the invention. The filter is identified generally by the reference numeral 10. The filter 10 comprises a substrate 12 with a layer of piezoelectric material 14 deposited or cemented thereon. An electrode 16 is interposed between the substrate 12 and the layer or film of piezoelectric material 14. Opposite the electrode 16 on the upper surface of the film 14 is a second electrode 18.

As shown in the drawing the electrodes 16 and 18 cover only a relatively small portion of the surface of the piezoelectric film 14. Corresponding to the electrodes 16 and 18 is a pair of electrodes 20 and 22 opposite each other on opposite portions of the lower and upper surfaces, respectively, of the piezoelectric film 14. As in the case of the electrode 16 the electrode 20 is interposed between the substrate 12 and the piezoelectric film 14. The electrodes 16 and 20 have been shown as separate and unconnected electrodes. It will be understood, however, that the invention does not exclude the use of a single electrode on one surface of the film 14 where a common ground is desired or where the device is to be employed as a three-terminal resonator or filter.

One pair of electrodes serves for connection to input 5 terminals and the other pair of electrodes for connection to output terminals. Either of the pairs of electrodes 16 and 18 and 20 and 22 may constitute the input electrodes with the other pair constituting the output electrodes. For example, the electrodes 16 and 18 may be connected to input terminals 24 and 26, respectively, and the electrodes 20 and 22 may be connected to output terminals 28 and 30, respectively. The wafer substrate 12 may be either circular or rectangular in shape. Likewise, the electrodes 16, 18, 20 and 22 may be either circular, rectangular or even less regular in shape. For control of mechanical coupling, however, they are preferably rectangular.

In the arrangement of FIG. 1 the layer 14 is composed of piezoelectric material which is polarized perpendicular to its surface. The piezoelectric axis 32 is perpendicular to the surface of the substrate 12.

The piezoelectric axis referred to in the case of wurtzite-type hexagonal crystals is the *c* axis. The axis is referred to as *c* axis in such materials as cadmium sulfide, cadmium selenide, zinc oxide, beryllium oxide, aluminum nitride, wurtzite zinc sulfide and solid solutions thereof. In sphalerite cubic crystals such as zinc sulfide and gallium arsenide, for example, the piezoelectric axis is the [111] axis. In ferroelectric crystals the ferroelectric axis may usually be identified as the piezoelectric axis. With ferroelectric lithium niobate and lithium tantalate this terminology is not appropriate, however, and one might rather identify either the ferroelectric axis (Z) or the Y-axis as a piezoelectric axis.

Although the filter illustrated in FIG. 1 has been indicated as having its piezoelectric axis perpendicular to the substrate 12 the invention is not limited thereto as other arrangements may be employed as will be described hereinafter.

For clarity in the drawing, the electrodes 16, 18, 20 and 22 have been shown relatively thick in comparison with the piezoelectric layer or film 14, which in turn has also been shown relatively thick compared to the substrate 12. In practice, however, the electrodes are much thinner than the piezoelectric layer, and the piezoelectric layer is a fraction of substrate thickness.

When the layer 14 is deposited upon the substrate 12, the deposit is formed with uniform thickness and the portion of the layer above an electrode merely rises slightly higher than the portion surrounding the electrode. Leads from the electrodes to the input and output terminals have been shown schematically and away from their actual position in the device as constructed in order to avoid confusion in the drawing. Preferably, however, the leads 34 and 36 from the electrodes 16 and 20 to the terminals 24 and 28, respectively, are integral with the electrodes 16 and 20 respectively and lie along the surface of the substrate 12. The actual construction of the electrodes, of the leads and of the layer 14, is not a part of the present invention and they may take the form illustrated in copending application of Daniel R. Curran and Don A. Berlincourt, Ser. No. 542,627 filed Apr. 14, 1966 now U.S. Pat. No. 3,401,275, issued Sept. 10, 1968 or the application of Don A. Berlincourt and Todd R. Sliker, Ser. No. 595,073 filed Nov. 17, 1966, now abandoned, or Ser. No. 768,584 filed Sept. 5, 1968 as a continuation-in-part of said application Ser. No. 595,073 and assigned to the assignee as the present application.

Substrate 12, which may be in the form of a wafer, is preferably formed from a material having a high mechanical Q, and as explained in more detail in the copending application of Curran and Berlincourt, may have a frequency temperature coefficient of magnitude and polarity such as to cancel the frequency temperature coefficient of the piezoelectric layer 14. Suitable materials for the substrate 12 are quartz and metallic compositions such as invar and elinvar. Among other materials which may be employed are lithium gallate, lithium niobate, lithium tantalate, and aluminum oxide.

The electrodes 16, 18, 20 and 22 are most conveniently formed by vapor deposition of electrically conductive materials such as gold or chromium or aluminum by one of the numerous techniques known in the prior art. When the electrodes are formed by vapor deposition a mask is placed on the surface of the substrate 12 or layer 14 to cover all the surface except the portion where the electrode is to be formed and the extending portion where the lead is to be formed.

The preferred method of forming the piezoelectric layer 14 is by vapor deposition of a layer of piezoelectric material on the surface of the wafer 12 as disclosed in copending application Ser. No. 363,369 filed on Apr. 29, 1964 by Lebo R. Shiozawa, now U.S. Pat. No. 3,409,464 issued Nov. 5, 1968, and assigned to the same assignee as the present invention. Materials selected from the group consisting of cadmium sulfide, cadmium selenide, zinc oxide, beryllium oxide, wurtzite zinc sulfide and solid solutions thereof can be vapor deposited on the surface of a substrate with an orientation such as to produce either a thickness extensional mode of vibration or a shear response. It is understood that this is not an inclusive list and that other materials with more favorable characteristics may be found and use of such materials is within the scope of this invention. Preferably the layer 14 is deposited on a substrate of quartz.

The device of FIG. 1 as described may employ piezoelectric material having a thickness extensional mode of vibration. However, the invention is not limited thereto; and piezoelectric film may be employed which has a shear response either with its piezoelectric axis parallel to the surface of the substrate 12 or tilting.

In the publication "Ultrahigh-frequency, CdS Transducers," IEEE Transactions on Sonics and Ultrasonics, Vo. SU-11, No. 2, pp. 63—68 (1964) by N. F. Foster and "Cadmium Sulfide Evaporated Layer Transducers," Proc. IEEE, Vol. 53, No. 10. pp 1400—1405 (1965) by N. F. Foster a process for vapor depositing cadmium sulfide is disclosed. The latter publication discusses obtaining an orientation to produce a thickness shear mode of vibration. Such prior art techniques are suitable for the formation of the layer 14 shown in FIG. 11.

A preferred combination for the embodiment shown in FIG. 1 comprises the film formed by the vapor deposition of cadmium sulfide on the substrate 12 of "AT-cut" quartz. The cadmium sulfide element is preferably vapor deposited by a process similar to that disclosed in the N. F. Foster publication with an orientation such as to produce a thickness shear mode of vibration. To achieve optimum temperature stability, "AT-cut" substrate 12 is slightly off-cut so that the quartz material has a slight positive temperature-frequency characteristic which counteracts the larger negative temperature frequency characteristic of the cadmium sulfide material. "AT-cut" quartz is much preferred because of its temperature stability and very favorable mechanical characteristics.

As is well known to those skilled in the art, the basic vibrational mode of a crystal plate is determined by the orientation of the plate with respect to the crystallographic axes of the crystal from which it is cut. It is known, for example, that a "zero degree Z-cut" of DKT or "AT-cut" of quartz may be used for a thickness shear mode of vibration. Certain ceramic compositions such as the lead titanate zirconates may also be used for wider bandwidths. Because of its high Q and low frequency-temperature coefficient, AT-cut quartz is the preferred substrate material and the description will be directed thereto.

The before-mentioned Foster publication disclosed that cadmium sulfide vapor deposited with an angle between the molecular beam and the plane of the substrate has a shear response. The shear response is optimum when the actual angle between the cadmium sulfide film's *c* axis and the perpendicular to the film surface is between 20° and 40° and maximum at about 30°. This is explained more fully in the aforementioned copending application of Curran and Berlincourt.

Resonator elements are formed by the portions of the piezoelectric layer or film 14 and the associated electrode pairs and portion of the substrate between the pair of electrodes. The resonator elements associated with electrode pair 16 and 18 and the electrode pair 20 and 22 may also have other such elements interposed to form a multiresonator composite coupled-mode filter as illustrated in FIG. 2 in order to increase the steepness of the skirts of the passband. In FIG. 2, as shown, portions of the film associated with intermediate resonator elements are mass loaded. Contrary to the arrangement of the aforesaid Curran and Berlincourt application and the aforesaid Berlincourt and Sliker application, however, the spacings of the portions of the piezoelectric layer between successive pairs of electrodes in FIG. 2 or between the pair of electrodes 16 and 18 and 20 and 22 in FIG. 1 are not made sufficient for acoustic isolation from each other but on the contrary are designed for mechanical coupling from one pair of electrodes to the next. The piezoelectric film 14 is preferably continuous from one set of electrodes to the next and preferably covers the major portion of the substrate.

The significant difference between the structure of the present application and the aforesaid copending application of Curran and Berlincourt is that in the present application there is critical coupling between resonators or very nearly critical coupling. In the multiresonator embodiment of the aforesaid Curran and Berlincourt application the resonators are uncoupled.

For selection of measured parameters to produce the desired coupling, it may be helpful to define mathematically interresonator coupling. A composite coupled-mode filter, as shown in FIG. 1, may be considered, consisting of two composite resonator elements formed and located as described previously.

To some extent, possibly immeasurably small, there will always be some mechanical coupling between the two resonator elements. Then, there will be a well defined mechanical mode of vibration of the entire structure (two electrode pairs, the common film, and the substrate) wherein both resonator elements are vibrating in a thickness extension (or both thickness shear) mode and wherein the resonator elements are vibrating in phase with respect to one another; that mode of vibration of the entire structure will be called the symmetric mode (even though the individual resonator elements may be vibrating in antisymmetric modes) and the characteristic frequency of that mode will be denoted $f_{symm}$.

Except for a degenerate case which will not occur if the resonator elements are sufficiently well separated, there is also a well defined mode of vibration of the entire structure wherein both resonator elements are vibrating in a thickness extension (or both thickness shear) mode and wherein the resonator elements are vibrating out of phase with respect to one another; that mode of vibration of the entire structure will be called the antisymmetric mode (even though the individual resonator elements may be vibrating in symmetric modes) and the characteristic frequency of that mode will be denoted $f_{asymm}$. Both characteristic frequencies are easily measurable parameters; $f_{symm}$ coincides with the low impedance resonant frequency of the two-terminal structure obtained when terminal 26 (of FIG. 1) is electrically connected to terminal 30 and terminal 24 is electrically connected to terminal 28, and $f_{asymm}$ coincides with the low impedance resonant frequency of the two-terminal structure obtained when terminal 26 is electrically connected to terminal 28 and terminal 24 is electrically connected to terminal 30.

Interresonator coupling *K* may be defined as follows:

$$K = \frac{fasym - fsymm}{\sqrt{fasym \times fsymm}}$$

Interresonator coupling *K* is a function of the elastic properties of the electrodes, film and substrate and of the dimensions of electrodes, film and substrate, and of the electromechanical coupling of the film. For given electrode, film and substrate materials, control of interresonator coupling is provided with variations of the dimensions of the electrodes, film and substrate.

In particular, interresonator coupling decreases with increasing electrode dimensions (both lateral dimensions and thickness) and with increasing resonator separation. The exact mathematical relation between *K* and the parameters affecting *K* is a complex relation which is not stated quantitatively herein since it depends upon a complicated theoretical analysis. However, it is known that, for large resonator separations (on the order of the lateral dimensions of a resonator element or greater), *K* decreases approximately as an exponential function of increasing resonator separation.

The fractional bandwidth of a composite coupled-mode filter is almost directly proportional to the interresonator coupling between resonator elements. Thus, for a desired bandwidth, within limitations imposed by the electromechanical coupling of the resonator elements, a desired interresonator coupling may be determined; electrode, film, and substrate materials and dimensions must be chosen to provide that coupling.

The distance between resonator elements is not the sole criterion in selection of parameters to obtain the requisite coupling.

From the foregoing description of the composite coupled-mode filter and of the structure disclosed in the aforesaid Curran and Berlincourt copending application, it might be inferred that the separation between resonator elements of the composite coupled-mode filter is small compared to the separation between resonator elements of the structure of the copending Curran and Berlincourt application. This, however, is not completely true. If, for instance, a narrow bandwidth composite coupled-mode filter is desired, it may turn out that the resonator elements are separated as much or more that resonator elements which, for another application, had been spaced such that coupling was avoided. Therefore, the distinction between the two structures cannot be simply the spacing between resonator elements nor even the interresonator coupling between two resonator elements.

Rather, the distinction between the two structures lies in the critical nature of the resonator separation for the composite coupled-mode filter. For the structure described in the aforesaid copending Curran and Berlincourt application, a small change in the separation of resonator elements will not change any of the characteristics of that structure whereas, for the composite coupled-mode filter described herein, a small change in the separation of resonator elements will cause an immediate change in the bandwidth of the device.

The concept of critical coupling is involved. A composite coupled-mode filter with proper terminal impedance is an almost critically coupled structure in the usual sense of critical coupling. Decreasing or increasing interresonator coupling of a composite coupled-mode filter having proper terminal impedances will result in an undercoupled or an overcoupled structure, respectively. However, depending upon the desired filter characteristics, a properly terminated composite coupled-mode filter might be slightly overcoupled or slightly undercoupled.

One of the objects of the invention is to provide a filter with a relatively wide passband and steep skirts which is useful in relatively high frequency ranges between approximately 100 and 1000 MHz.

One of the objects of the invention is to provide a miniature electric-wave filter having a bandwidth in the range of 0.1 percent to 3.0 percent of its center frequency, having low minimum insertion loss, high stopband rejection, sharp discrimination between passband and stopband frequencies, and center frequency in the range from 100 MHz. to 1000 MHz. The cited ranges of bandwidth and of center frequency should not be considered the limit of range of usefulness of the proposed device; these ranges were noted because outside those ranges there are other means to provide high performance filtering whereas, within the cited ranges, there presently is not such a means.

Relatively steep-skirt filters which have been employed in the past have been useful primarily at lower frequencies. Typical of these are inductance-capacity filters and piezoelectric filters (some of which are also coupled-mode filters).

The simplest coupled-mode filter consists of two identical electrode pairs to form two identical resonators on a common piezoelectric substrate such as AT-cut quartz. The two resonators are coupled so that when one resonator is driven electrically at its resonant frequency, the other resonator is excited and an electrical output is obtained across the electrodes of the second resonator. On the other hand, when one resonator is driven electrically at a frequency distant to its resonant frequency, neither resonator tends to be excited and hence there tends to be no electrical output across the electrode to the second resonator.

In such a coupled-mode filter there are two distinct modes of vibration having different resonant frequencies, both contained within the passband. The steepness of the skirts and the selectivity of the filter, depend strongly upon the number of resonant frequencies associated with the filter and, therefore, the coupled-mode filter is inherently a more selective filter than a thin filter transformer of the type described in the copending application of Don A. Berlincourt and Todd R. Sliker, Ser. No. 595,073, filed Nov. 17, 1966 and assigned to the same assignee as the present application. In general, a coupled-mode filter consisting of an array of $n$ resonators, not necessarily all identical, may have (typically but not necessarily) $n$ different modes of vibration having different resonant frequencies all contained within a filter passband. The more modes of vibration a coupled-mode filter has, the more selective it may be. The thin film filter transformer on the other hand has only one mode of vibration and, therefore, only one resonant frequency.

A coupled-mode filter may be considered as an array of piezoelectric resonators such that there is coupling between resonators in some pairs of resonators. This approach gives rise to a ladder network representation of the device.

A coupled-mode filter may also be considered as a piezoelectric resonator having a multiplicity of anharmonically related modes of vibration, each of which may be excited independently from either of two electrode pairs. The filter response is directly related to the characteristic frequency of each mode of vibration, electromechanical coupling (at each electrode pair) of each mode of vibration and the relative phase (between electrode pairs) of each mode of vibration. This approach gives rise to a full lattice and hybrid lattice representation of the device.

Typically, the characteristic frequencies of the two modes of vibration of the two resonator coupled-mode filter nearly coincide with the passband edges. The difference between the characteristic frequencies and, therefore, the filter bandwidth is a function of the coupling between the resonators. Interresonator coupling is a function of the resonator electrode dimensions, the thickness of the piezoelectric substance, the separation between the resonators, and the properties of the electrodes, substrate, and piezoelectric film. Coupling and bandwidth increase as the resonators are moved close together and typically decrease as electrode thickness is increased. For the coupled-mode filter with a multiplicity of resonators, the relationship of bandwidth to electrode and substrate dimensions and resonator separation is generally the same (although slightly more complex) as for the two-resonator device.

The quartz coupled-mode filter is best compared to a quartz hybrid-lattice filter such as represented schematically in FIG. 3, wherein a transformer is employed in conjunction with two separate resonators. Prior to the interest in coupled-mode filters the quartz hybrid-lattice filter was the device best suited to obtaining stable narrow band-pass filters having high stopband rejection and having passbands centered in the 10 to 100 megaherz range. The coupled-mode filter and the hybrid-lattice filter are electrically equivalent and each is electrically equivalent to a full lattice filter. The full lattice filter contains twice as many resonators as its hybrid-lattice equivalent and thus is only of historical interest at this time.

Theoretically, all three filter types can provide infinite ultimate stopband rejection; however, in practice, ultimate stopband rejection is found to be finite. For the hybrid lattice of FIG. 3, if the two halves of the transformer are identical, if there were no loss in the resonators and if the static capacitances of the two resonators are identical, the ultimate stopband rejection would be infinite. For the coupled-mode filter, infinite ultimate stopband rejection is theoretically obtained ignoring loss in the resonators if there is no stray capacitance between the input and the output terminals. In practice, substantially more ultimate stopband rejection is obtained from the coupled-mode filter than from its equivalent hybrid-lattice filter because it is easier to minimize stray capacitors between input and output (simply with proper shielding) than it is to balance transformer halves and to balance resonator static capacitances.

The coupled-mode filter typically has lower minimum insertion loss than its equivalent hybrid lattice because the losses in the transformers required for the hybrid-lattice filters are substantially greater than in the piezoelectric resonators in either device. Because transformers are typically large compared to quartz resonators, the coupled-mode filter requires a smaller package than that required for the equivalent hybrid-lattice filter. The composite coupled-mode filter has advantages over a simple coupled-mode filter, namely much higher frequency operation.

Since a choice of film and substrate materials is possible, one may choose materials having opposite temperature characteristics which are about as stable with temperature as with a simple quartz coupled-mode filter—and much better than with coupled-mode filters made of piezoelectrics other than quartz.

As in the comparison between the composite resonator and the simple resonator, it is possible for the input and output transducers of the composite structure to have greater electromechanical coupling than the input and output transducers of the simple structure in the 100—1000 MHz. range. A direct consequence of that is that greater bandwidths may be achieved with the composite couple-mode filter than with the simple coupled-mode filter in this frequency range.

The greater electromechanical coupling results from the fact that with an overtone mode simple structure, the electromechanical coupling is reduced by the factor $1/\sqrt{n}$, where $n$ is the overtone order. With the composite structure the coupling factor of the device is reduced by approximately $1/n$, where $n$ is chosen so that the active film is not far from one-half acoustic wavelength. The smaller reduction is due to the fact that the dielectric energy is stored only in the active film where there is no cancellation. With a 30 MHz. fundamental AT cut-quartz plate, the effective electromechanical coupling $k$ at 270 MHz. is thus only 0.01. With a CdS-quartz composite structure (shear mode with CdS Z-axis 39° from plate normal) the effective $k$ at 270 MHz. is about 0.06, with the fundamental also 30 MHz. and the CdS film about one-half wavelength thick at 270 MHz.

The composite coupled-mode filter also has advantages over hybrid-lattice filters using composite resonators. For the reasons hereinbefore stated, the composite coupled-modes filter should have lower minimum insertion loss, higher stopband rejection, smaller mass, and smaller volume than hybrid-lattice filters utilizing composite resonators.

The composite resonator described in the copending application of Daniel R. Curran and Don A. Berlincourt, Ser. No. 542,627, filed Apr. 14, 1966, assigned to the same assignee as the present application is a piezoelectric resonator having an extremely large range of parameters compared to other piezoelectric resonators and having other advantages over other resonant structures, particularly, in the frequency range of 100 to 1000 megahertz. Inductance-capacity tuned circuits have high losses. Transmission line stubs and waveguide cavities are large. Quartz resonators, which must be operated at overtone modes to maintain some structural strength sturdiness, have small dynamic capacitances and small piezoelectric coupling; filters which incorporate only resonators with small piezoelectric coupling cannot have large bandwidths. With the composite resonator, dielectric energy is stored in only a portion of the resonator for instance, one-half wavelength, while with a conventional resonator whose thickness is several half wavelengths dielectric energy is stored in the entire resonator. Dielectric cancellation is therefore eliminated in the composite resonator; piezoelectric coupling and dynamic capacitance are increased over the case where the entire resonator is driven electrically at a high overtone. The relative thickness of the film may be varied so as to trade off properties of the film for properties of the substrate; for instance, in the piezoelectric film-quartz composite the higher piezoelectric coupling allowed by the structure with films of good piezoelectric properties is traded off against the higher mechanical quality factor of the quartz. In principle, however, a film might have a mechanical quality factor as high as that of quartz. Another characteristic important to piezoelectric resonators is the variation of resonant frequency with respect to temperature; it is possible to combine a substrate having a frequency-temperature relation such that it virtually cancels the frequency-temperature relation of the piezoelectric film, so that the resonant frequency of the composite structure is virtually constant with temperature change.

The simplest composite coupled-mode filter in accordance with the invention as shown in FIG. 1 consists of two identical composite resonators which are on a common substrate and which are mechanically coupled. The electrodes of one resonator are the filter input terminals and the electrodes of the other resonator are filter output terminals. The most general composite coupled-mode filter consists of an array, such as shown in FIG. 2, of $n$ composite resonators (not necessarily all identical) on a common substrate and may have $n$ distinct modes of vibration.

The composite mode filter illustrated in FIGS. 1 and 2 in accordance with the invention is not comparable with filters heretofore available because in the 100 to 1000 megahertz range there are very few satisfactory band-pass filters. Transmission line filters and cavity filters are large. Inductance capacity filters are also large and have high losses and are completely inadequate for high performance filtering. Except for the composite resonator there have been no piezoelectric resonators suitable for band-pass filters centered above 150 megahertz.

A theoretical electrical equivalent of the composite coupled-mode filter would be a hybrid-lattice filter. However, the composite coupled-mode filter will have lower minimum insertion loss and a greater stopband rejection than the theoretical equivalent composite hybrid-lattice filter with the actual characteristics of the balancing transformer.

The composite coupled mode filter may be fabricated generally using the procedures similar to those for a thin film filter transformer as described in the aforesaid copending application of Berlincourt and Sliker. The device may utilize thickness extension or either thickness shear modes of vibration. A multiplicity of thin films may be utilized. Each individual resonator may be comprised of a number of interconnected electrodes as with the thin film filter transformer as described in said Berlincourt and Sliker application. The individual resonators may be arranged in either a linear or rectangular array. The electrodes of the individual resonators, except for input and output resonators, may or may not be grounded, indeed those resonators require no electrodes.

As previously stated, for an $n$-resonator (simple or composite) coupled-mode filter, for which the resonators are sufficiently well spaced to avoid degenerate cases, there are $n$ modes of vibration associated with the filter. The following description of the $n$ modes of an $n$-resonator filter is restricted to coupled-mode filters consisting of linear arrays of coupled resonators.

For the two modes of the two-resonators coupled-mode filter, both resonators vibrate in thickness extensional modes or both vibrate in thickness shear modes. For the mode of the entire structure having the lower characteristic frequency, the resonators vibrate in phase with respect to one another; and, for the mode of the entire structure having the higher characteristic frequency, the resonators vibrate out of phase with respect to one another. Both modes of the entire structure are electrically excitable from the electrical terminals of either resonator with the other resonator short-circuited.

For the three modes of the three-resonator coupled-mode filter, all three resonators vibrate in thickness extensional modes or all three resonators vibrate in thickness shear modes. For the mode of the entire structure having the lowest characteristic frequency, the resonators vibrate in phase with respect to one another. For the modes of vibration of the entire structure having the highest characteristic frequency, the resonators in each pair of adjacent resonators vibrate out of phase with respect to one another; in particular, the end resonators vibrate in phase. For the other mode of the entire structure, for which the characteristic frequency typically is approximately the geometric means of the highest and the lowest characteristic frequencies, the end resonators vibrate out of phase with respect to one another and the two halves of the central resonator vibrate out of phase with respect to one another. For the mode of the entire structure having the lowest characteristic frequency the end resonators vibrate in phase, for the mode of the entire structure having the second lowest characteristic frequency the end resonators vibrate out of phase, and for the mode of the entire structure having the third lowest characteristic frequency the end resonators vibrate in phase. All three modes of the entire structure are electrically excitable from the pair of electrical terminals of either end resonator with the other resonators short-circuited.

The existence of the *n* modes of vibration of the (simple) *n*-resonator coupled-mode filter has been verified empirically at Bell Telephone Laboratories; experimental results were shown by W. D. Beaver at the Twenty-first Annual Symposium on Frequency Control in his paper entitled "Theory and Design of the Monolithic Crystal Filter."

In general, for the *n* modes of the *n*-resonator coupled-mode filter, all *n* resonators vibrate in thickness extensional modes (or, for all modes, all resonators vibrate in thickness shear modes). For the mode of the entire structure having the lowest characteristic frequency the end resonators vibrate in phase, for the mode of the entire structure having the second lowest characteristic frequency the end resonators vibrate out of phase, for the mode of the entire structure having the third lowest characteristic frequency the end resonators vibrate in phase. All *n* modes of the entire structure are electrically excitable from the pair of electrical terminals of either end resonator with all other resonators short-circuited.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover in the claims all such modifications and variations as fall within the scope of the invention.

What we claim is:

1. A composite coupled-mode filter comprising in combination a substrate, a film of piezoelectric material on said substrate and substantially thinner than said substrate and a plurality of spaced electrodes each covering different portions of the surfaces of the piezoelectric film to form input and output electrode means and to form composite resonant structures in the substrate-film electrode combination under and immediately surrounding the electrodes, the electrodes being substantially thinner than the piezoelectric film, the resonant structures so formed being spaced such that, with suitable filter termination, substantially critical mechanical coupling determines the band-pass characteristics of the filter.

2. A composite coupled-mode filter as described in claim 1, wherein a plurality of portions of the surface having piezoelectric film are electroded, a pair of electrodes at opposite surfaces of a portion of the film forming input electrode means and a pair of electrodes at opposite surfaces of another portion of the film serving as output electrode means, other portions of the film spaced from each other and from the portions at which said pairs of electrodes are located serving to form in combination an array of a plurality of composite resonators on a common substrate with a plurality of distinct modes of vibration.

3. A composite coupled-mode filter as described in claim 1 wherein a pair of electrodes on opposite surfaces of a portion of the piezoelectric film serve as input electrode means, a pair of electrodes on opposite surfaces of a different portion of the piezoelectric film serve as output electrode means and intermediate portions of the film between the input and output electrode means are mass loaded to form a plurality of resonators.

4. A composite coupled-mode filter comprising in combination a substrate, a film of piezoelectric material on a substrate and a plurality of spaced electrodes each covering different portions of the surfaces of the piezoelectric film to form input and output electrode means and to form resonant structures under portions of the film covered by electrodes, the resonant structures so formed being spaced such that, with suitable filter termination, substantially critical mechanical coupling between said resonant structures determines the band-pass characteristics of the filter, the thickness of the piezoelectric film being of the order of one-tenth the thickness of the substrate and the thickness of the electrodes being of the order of one-tenth the thickness of the piezoelectric film.

5. A composite coupled-mode filter as described in claim 1 wherein the piezoelectric film comprises vapor deposited piezoelectric materials selected from the group consisting of cadmium sulfide, cadmium selenide, zinc oxide, beryllium oxide, wurtzite zinc sulfide, wurtzite aluminum nitride, lithium niobate, lithium tantalate and solid solutions thereof.

6. A composite coupled-mode filter as described in claim 1, wherein the spaced electrodes are of restricted dimensions and the film is in direct contact with the substrate except where an electrode intervenes, at which portions the film is in direct contact with the electrode and the electrode is in turn, in direct contact with the substrate.

7. A composite coupled-mode filter as described in claim 1 with characteristic frequencies chosen to provide critical interelectrode coupling.

8. A composite coupled-mode filter as described in claim 1 with characteristic frequencies chosen to provide an interelectrode coupling within the range of slight undercoupling and slight overcoupling with suitable filter termination.